United States Patent [19]

Bopp

[11] Patent Number: 5,189,076
[45] Date of Patent: Feb. 23, 1993

[54] POLYPHENYLENE ETHER RESINS AND COMPOSITIONS HAVING REDUCED ODOR AND METHOD OF REDUCING ODOR IN SAME

[75] Inventor: Richard C. Bopp, West Coxsackie, N.Y.

[73] Assignee: General Electric Company, Pittsfield, Mass.

[21] Appl. No.: 624,170

[22] Filed: Dec. 7, 1990

Related U.S. Application Data

[62] Division of Ser. No. 206,174, Jun. 13, 1988, Pat. No. 5,017,656.

[51] Int. Cl.$^5$ .................... C08G 65/44; C08L 71/12
[52] U.S. Cl. .................... 521/180; 521/139; 521/140; 521/148; 521/182; 521/189
[58] Field of Search .................. 71/206, 174; 521/139, 521/140, 180, 182, 189, 148

[56] References Cited

U.S. PATENT DOCUMENTS

| | | |
|---|---|---|
| 3,375,228 | 3/1968 | Holoch et al. . |
| 3,947,387 | 3/1976 | Lundberg ............................ 521/144 |
| 4,369,278 | 1/1983 | Kasahara et al. . |
| 4,588,754 | 5/1986 | Liu ....................................... 521/182 |
| 4,684,669 | 8/1987 | Wroczynsbli ........................ 521/180 |
| 4,695,594 | 9/1987 | Pressman ............................. 521/180 |
| 4,751,268 | 6/1988 | Taubitz et al. . |

Primary Examiner—Jacob Ziegler
Attorney, Agent, or Firm—Andrew C. Hess

[57] ABSTRACT

The odor of blends of polyphenylene ether resin, alone, or in combination with a polystyrene resin or a high impact polystyrene is improved by including a carboxylic acid, and acid anhydride or mixture thereof in the compositions.

8 Claims, No Drawings

POLYPHENYLENE ETHER RESINS AND COMPOSITIONS HAVING REDUCED ODOR AND METHOD OF REDUCING ODOR IN SAME

This is a division of application Ser. No. 07/206,174, filed Jun. 13, 1988, now U.S. Pat. No. 5,017,656.

BACKGROUND OF THE INVENTION

1. FIELD OF THE INVENTION

The present invention relates to polyphenylene ether resins and compositions having reduced odor and, more specifically, to blends of a polyphenylene ether resin and a polystyrene or a high impact polystyrene in which a carboxylic acid or anhydride is used individually or in combination to reduce the odor of the polyphenylene ether resin or the composition comprising a polyphenylene resin. In particular, the invention relates to low density polyphenylene ether foams or a composition comprising a low density polyphenylene ether resin and polystyrene, styrenic copolymers or high impact polystyrene foam which has reduced odor.

2. DESCRIPTION OF THE PRIOR ART

Thermoplastic polyphenylene ether resins and compositions of polyphenylene ether resins and a polystyrene or a high impact polystyrene are known to be useful for injection molding and foam molding into a variety of articles characterized by highly desirable property profiles. The issue of unpleasant odor associated with polyphenylene ether resins and blends of polyphenylene ether with polystyrene or high impact polystyrene resins has been longstanding with many plastics processors, particularly in low density extruded foam applications and processes.

With the wider use of these resins and compositions in products as insulation materials for the building industry, the need has grown for polyphenylene ether resins or compositions comprising a polyphenylene ether resin and a polystyrene or a high impact polystyrene which exhibit reduced odor, especially in low density foams. It is believed that such polyphenylene ether resins, or compositions comprising polyphenylene ether resin and a polystyrene, styrenic copolymers or high impact polystyrene, and a carboxylic acid or anhydride or combination of carboxylic acid and anhydride will satisfy that need.

SUMMARY OF THE INVENTION

With the present invention, the discovery has been made that useful polyphenylene ether resins or compositions of a polyphenylene ether resin and a polystyrene or high impact polystyrene can be made by incorporating a carboxylic acid or anhydride or mixtures of the two into the resin or blend. The resulting resins and compositions should find wide application in industry, especially in the building and construction industry where residual odor of construction materials, in particular of low density foamed insulation materials utilized in internal applications, has been a problem.

The blends are extrudable and moldable into a broad spectrum of shaped plastic products.

DESCRIPTION OF THE INVENTION

Briefly described, the compositions of the present invention comprise thermoplastic blends of (a) a polyphenyene ether resin or a polyphenylene ether resin and a polystyrene or a rubber modified, high impact polystyrene resin; and (b) a carboxylic acid, acid anhydride or mixture of the foregoing in an amount sufficient to effectively reduce the odor of (a).

Also included within the scope of the present invention is a method of reducing the odor in a polyphenylene ether resin, alone, or in combination with a polystyrene resin or a high impact polystyrene resin. The method comprises adding an effective odor reducing amount of a carboxylic acid, acid anhydride or mixture thereof to a thermoplastic composition comprised of a polyphenylene ether, alone, or in combination with a polystyrene or rubber-modified high impact polystyrene.

The polyphenylene ethers(also known as polyphenylene oxides) used in the present invention are a well known class of polymers which have become very useful commercially as a result of the discovery by Allan S. Hay of an efficient and economical method of production (See, for example, U.S. Pat. Nos. 3,306,874 and 3,306,875, which are incorporated herein by reference). Numerous modifications and variations have since been developed but, in general, they are characterized as a class by the presence of arylenoxy structural units. The present invention includes all such variations and modifications, including but not limited to those described hereinafter.

The polyphenylene ethers favored for use in the practice of this invention generally contain structural units of the following formula

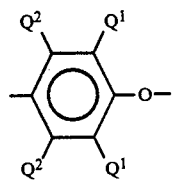  (I)

in which in each of these units independently each $Q^1$ is hydrogen, halogen, primary or secondary lower alkyl containing up to 7 carbon atoms, phenyl, haloalkyl or aminoalkyl wherein at least two carbon atoms separate the halogen or nitrogen atom from the benzene ring, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen.

Both homopolymers and copolymers are included in the foregoing description. Suitable homopolymers are those containing, for example, 2,6-dimethyl-1,4-phenylene ether units. Suitable copolymers include random copolymers containing such units in combination with, for example, 2,3,6-trimethyl 1,4-phenylene ether units. Many suitable random copolymers, as well as homopolymers, are disclosed in the patent literature, including the various Hay patents. Also contemplated are graft copolymers, including those prepared by grafting onto the polyphenylene ether chain such vinyl monomers as acrylonitrile and vinyl aromatic compounds (for example, styrene) and such polymers as polystyrenes and elastomers. Still other suitable polyphenylene ethers are the coupled polyphenylene ethers in which the coupling agent is reacted with the hydroxy groups of the two polyphenylene ether chains to increase the molecular weight of the polymer. Illustrative of the coupling agents are low molecular weight polycarbonates, quinones, heterocycles and formals.

The polyphenylene ether generally has a molecular weight (number average, as determined by gel permeation chromatography, whenever used herein) within the range of about 5,000 to 40,000. The intrinsic viscosity of the polymer is usually in the range of about 0.30 to 0.6 deciliters per gram (dl./g.), as measured in solution in chloroform at 25° C.

The polyphenylene ethers may be prepared by known methods, and typically by the oxidative coupling of at least one corresponding monohydroxyaromatic (e.g., phenolic) compound. A particularly useful and readily available monohydroxyaromatic compound is 2,6-xylenol (in which for the above formula each $Q^1$ is methyl and each $Q^2$ is hydrogen), the corresponding polymer of which may be characterized as a poly(2,6-dimethyl-1,4-phenylene ether).

Any of the various catalyst systems known in the art to be useful for the preparation of polyphenylene ethers can be used in preparing those employed in this invention. For the most part, they contain at least one heavy metal compound, such as a copper, manganese or cobalt compound, usually in combination with various other materials. Among the preferred catalyst systems are those containing copper. Such catalysts are disclosed, for example, in the aforementioned U.S. Pat. Nos. 3,306,874 and 3,306,875, and elsewhere. They are usually combinations of cuprous or cupric ions, halide ions (i.e., chloride, bromide or iodide), and at least one amine.

Also preferred are catalyst systems containing manganese. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (both monomeric and polymeric), o-hydroxyaryl oximes, and Ω-diketones. Also useful are cobalt-containing catalyst systems. Those skilled in the art will be familiar with patents disclosing manganese and cobalt-containing catalyst systems for polyphenylene ether preparation.

Especially useful polyphenylene ethers for the purposes of this invention are those which comprise molecules having at least one of the end groups of formulas II and III, below, in which $Q^1$ and $Q^2$ are as previously defined, each $R^1$ is independently hydrogen or alkyl, providing that the total number of carbon atoms in both $R^1$ radicals is 6 or less, and each $R^2$ is independently hydrogen or a $C_{1-6}$ primary alkyl radical. Preferably, each $R^1$ is hydrogen and each $R^2$ is alkyl, especially methyl or n-butyl.

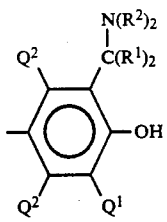

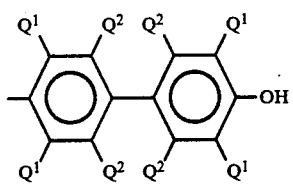

Polymers containing the aminoalkyl-substituted end groups of formula II may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals adjacent to the hydroxy group on the terminal unit of the polymer chain. During further processing and/or blending, the aminoalkyl-substituted end groups may undergo various reactions, probably involving a quinone methide-type intermediate of formula IV, below ($R^1$ is defined as above), with beneficial effects often including an increase in impact strength and compatibilization with other blend components.

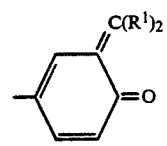

Polymers with biphenol end groups of formula III are typically obtained from reaction mixtures in which a by-product diphenoquinone of formula V, below, is present, especially in a copper-halide-secondary or tertiary amine system. In this regard, the disclosures of U.S. Pat. Nos. 4,234,706, 4,477,649 and 4,482,697 are particularly pertinent, and are incorporated herein by reference. In mixtures of this type, the diphenoquinone is ultimately incorporated into the polymer in substantial amounts, chiefly as an end group.

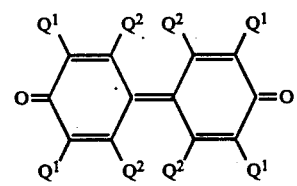

In many polyphenylene ethers obtained under the conditions described above, a substantial proportion of the polymer molecules, usually as much as about 90% by weight of the polymer, contain end groups having one or frequently both of formulas II and III. It should be understood, however, that other end groups may be present and that the invention in its broadest sense may not be dependent on the molecular structures of the polyphenylene ether end groups. It will thus be apparent to those skilled in the art that a wide range of polymeric materials encompassing the full recognized class of polyphenylene ether resins are contemplated as suitable for use in the practice of the present invention.

The polystyrene resins are broadly defined herein as at least in part from compounds of the formula

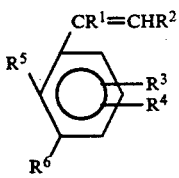

wherein $R^1$ and $R^2$ are selected from the group consisting of lower alkyl or alkenyl groups of from 1 to 6 carbon atoms, and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms, or $R^5$ or $R^6$ may be concatenated together with hydrocarbonyl groups to form a naphthyl group.

Compounds within the above formula include styrene and its homologs and analogs. In addition to styrene, examples include alpha-methyl styrene, paramethyl styrene, 2,4-dimethyl styrene, chlorostyrene, dichlorostyrene, bromostyrene, dibromostyrene, p-tert-butylstyrene, p-ethylstyrene, vinyl xylene, divinylbenzene, and vinyl naphthalene. Styrene is especially preferred.

The rubber modified, high impact polystyrene useful in the present compositions can be selected from any of the materials known generally in the art as high impact polystyrenes, or HIPS. In general, these modified polystyrene resins are made by adding rubber during or after polymerization of the styrene, to yield an interpolymer of rubber and polystyrene, a physical admixture of rubber and polystyrene, or both, depending on the particular process employed.

Suitable rubber modifiers include polybutadiene, polyisoprene, polychloroprene, ethylene-propylene copolymers (EPR), ethylene-propylene-diene (EPDM) rubbers, styrene-butadiene copolymers (SBR), and polyacrylates. The amount of rubber employed will vary, depending on such factors as the process of manufacture and individual requirements.

Included within this family of materials for purposes of the present invention are more recently developed forms in which such factors as the rubber particle size, the gel and cis contents of the rubber phase, and the rubber volume percent are regulated or controlled to achieve improvements in the impact resistance and other properties. These kinds of HIPS are described in the patent literature, including U.S. Pat. No. 4,128,602 (Abolins, Katchman and Lee, Jr ), and U.S. Pat. No. 4,528,327 (Cooper and Katchman), which are incorporated herein by reference.

Also contemplated as suitable for use are high impact polystyrenes having morphological forms which are sometimes referred to as core-shell, comprising particles of rubber encapsulated polystyrene dispersed in a matrix of polystyrene resin. Examples of this type are disclosed in U.S. Pat. No. 4,513,120 (Bennett, Jr. and Lee, Jr.), incorporated herein by reference, as well as the abovementioned U.S. Pat. No. 4,528,327.

The carboxylic acid useful as component (b) in the compositions and method of the present invention can be selected from any of the known carboxylic acids which are represented by the general formula:

$$X-COOH$$

where X is selected from hydrogen (formic acid); methyl (acetic acid); alkyl, $CH_3(CH_2)_n$, where n is a whole number and is at least equal to 1 and is preferably 2 to 16; aryl; branched cyclic or substituted alkyl acids; branched cyclic or substituted alkenyl; or substituted aryl.

Among those acids which may be effective are: formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, cyclohexanecarboxylic acid, phenylacetic acid, benzoic acid, o-toluic acid, m-toluic acid, p-toluic acid, o-chlorobenzoic acid, m-chlorobenzoic acid, p-chlorobenzoic acid, o-chlorobenzoic acid, m-bromobenzoic acid, p-bromobenzoic acid, o-nitrobenzoic acid, m-nitrobenzoic acid, p-nitrobenzoic acid, salicylic acid, p-hydroxybenzoic acid, anthranilic acid, m-aminobenzoic acid, p-aminobenzoic acid, o-methoxybenzoic acid, m-methoxy benzoic acid, p-methoxybenzoic acid, methyl butyric acid; dimethylvaleric acid; phenylbutyric acid; chloro methylbutyric acid; hydroxypropionic acid (lactic acid); dinitrobenzoic acid; methylbutanoic acid; phenylpropanoic acid; (chlorophenyl) butanoic acid and butenoic acid and the like.

Also useful as component (b) in the compositions and method of the present inventions are dicarboxylic acids which are represented by the general formula:

$$HOOC-X-COOH$$

where X is a single bond or is a difunctional radical selected from straight or branched alkyl radicals, straight or branched alkenyl radicals, aryl radicals, or substituted radicals of any of the foregoing.

Where X is a single bond, the resulting dicarboxylic acid is oxalic acid. Where X represents a difunctional radical, some of the resulting dicarboxylic acids which may be utilized are malonic acid; succinic acid; glutaric acid; adipic acid; maleic acid; fumaric acid; phthalic acid; isophthalic acid; terephthalic acid; bromoglutaric acid; dimethylglutaric acid and the like.

Component (b) may also be a tricarboxylic acid such as citric acid and the like.

When a carboxylic of any of the types broadly described above, component (b) is preferably selected from succinic acid, glutaric acid, adipic acid and citric acid; especially preferred is glutaric acid.

Component (b) may also be any acid anhydride. These are often derived from a carboxylic acid, such as acetic acid which yields acetic anhydride, maleic acid which yields maleic anhydride, succinic acid which yields succinic anhydride, phthalic acid which yields phthalic anhydride and the like. Especially preferred are succinic and phthalic anhydride.

Component (b) may also be a copolymer of an alkenyl aromatic resin and an acid anhydride monomer. For example, a copolymer of styrene and maleic anhydride can be utilized.

In formulating the compositions in accordance with this invention, a polyphenylene ether alone may be used as component (a) and component (b) is present in an amount sufficient to effectively reduce the odor in the resulting thermoplastic composition. When component (a) is a polyphenylene ether with a polystyrene or a high impact polystyrene, amounts for the above mentioned ingredients are selected which preferably fall within certain preferred ranges, as follows:

| Ingredients | Amount, Parts by Weight |
|---|---|
| (a) Polyphenylene ether | 10 to 90 |
| polystyrene, styrenic copolymers or high impact polystyrene | 90 to 10 |
| TOTAL: | 100 parts by weight |
| (b) Carboxylic acid, acid anhydride, or copolymer of an alkenyl aromatic and acid anhydride | 0.1 to 10 |
| per 100 parts of (a). | |

The present kinds of compositions can also be formulated to include other ingredients in addition to those just described. These may be selected from among conventional materials commonly employed in polyphenylene ether resins and blends, some of which are non-polymeric, others of which can be polymeric. Examples are plasticizers, mold release agents, melt viscosity reducers, colorants, stabilizers, antioxidants, mineral fillers (for example, clay), glass reinforcements, titanium oxides, lubricants, and so forth. Conventional amounts varying, for example, from less than 1 to greater than 50 percent by weight, per 100 percent by weight of the total composition, may be utilized.

The compositions can be prepared by any convenient method and, preferably, by forming a preblend of the ingredients, compounding the preblend by passing it through an extruder, and cooling the extrudate and cutting it into pellets or tablets. The tabletted composition can later be formed into the desired article, as by molding at elevated temperatures. The tabletted composition can also be extruded into sheets or boards, and particularly low density extruded from sheets or boards useful in structural applications.

Because of their thermoplastic nature, the present compositions are suitable for injection molding processes. Using standard procedures and conditions, these blends can be molded to various shapes and sizes, preferred among which are low density, foamed articles and the resulting products are characterized by having reduced odor as compared to the resins and blends which do not contain component (b).

DESCRIPTION OF THE SPECIFIC EMBODIMENTS

The invention is further illustrated in the description below, which is set forth to show a preferred or best embodiment.

EXAMPLE 1-6

The compositions shown in Table 1 were prepared by forming a dry blend of the ingredients, compounding the blend by passage through a 28mm Werner Pfleiderer twin-screw extruder at an about 570° F. –592° F. melt temperature, and cooling and chopping the extrudate into pellets. The pellets were stored in glass jars for evaluation of color and appearance

TABLE 1

| | Compositions | | | | | |
|---|---|---|---|---|---|---|
| Example | 1 | 2 | 3 | 4 | 5 | 6 |
| Components (pbw) | | | | | | |
| Polyphenylene ether | 50 | 50 | 50 | 50 | 50 | 50 |
| "Crystal" polystyrene | 50 | 50 | 50 | 50 | 50 | 50 |
| Adipic Acid | — | 1 | — | — | — | — |
| Glutaric Acid | — | — | 1 | — | — | — |
| Citric Acid | — | — | — | 1 | — | — |
| Succinic Acid | — | — | — | — | 1 | — |
| Succinic Anhydride | — | — | — | — | — | 1 |

Relative odor for each sample in Examples 1-6 was determined from force-ranked results obtained from 10 participants through olfactory evaluation of unlabelled bottled samples in random order. The unmodified control (Example 1) was generally selected as the most odoriferous, with six (60%) of the participants selecting it as having the worst odor and only one selecting it as having the best odor. The sample containing glutaric acid was the clear choice of the test participants as having the best odor, with seven (70%) of the participants selecting it as best, with one participant selecting the composition containing adipic acid as best and one participant selecting the composition containing succinic anhydride as best. The composition containing adipic acid was judged second or third best an additional six times (60%), that containing glutaric acid was judged second or third best an additional one time (10%) that containing citric acid was judged second or third best five times (50%), that containing succinic acid was judged second or third best four times (40%) and that containing succinic anhydride was judged second or third best an additional four times (40%). The results are fully set forth in Table II.

TABLE II

| | RELATIVE ODOR | | | | | |
|---|---|---|---|---|---|---|
| Participant | Worst | | | | | Best |
| 1 | 1 | 5 | 4 | 6 | 2 | 3 |
| 2 | 2 | 4 | 6 | 5 | 1 | 3 |
| 3 | 1 | 2 | 4 | 6 | 5 | 3 |
| 4 | 1 | 4 | 3 | 5 | 6 | 2 |
| 5 | 6 | 5 | 1 | 2 | 4 | 3 |
| 6 | 1 | 2 | 3 | 4 | 5 | 6 |
| 7 | 6 | 3 | 5 | 2 | 4 | 1 |
| 8 | 4 | 5 | 1 | 2 | 6 | 3 |
| 9 | 1 | 6 | 5 | 4 | 2 | 3 |
| 10 | 1 | 5 | 6 | 4 | 2 | 3 |

EXAMPLES 7-8

Compositions of a 50/50 blend of polyphenylene ether/polystyrene as in Examples 1-6, but additionally containing 1 part by weight of tridecylphosphate and 0.15 part by weight each of ZnS and ZnO, were prepared according to the procedure of Examples 1-6. The composition of Example 7 contained no odor reducing stabilizer. The odor reducing stabilizer adipic acid was added to Example 8 in an amount of 1 part by weight. Seven of the ten participants (70%) judged the composition of Example 8 as having the same (1) or better (6) odor.

EXAMPLES 9-14

The "crystal" polystyrene of Examples 1-6 is replaced with and equal amount of a rubber-modified high impact polystyrene and similar odor reducing results are obtained by the use of 1 pbw of the odor reducing stabilizer of Examples 2-6.

EXAMPLES 15-16

The crystal polystyrene of Examples 7-8 is replaced with an equal amount of a rubber modified high impact polystryene and similar odor reducing results are obtained by the use of 1 pbw of adipic acid as the odor reducing stabilizer.

EXAMPLES 17-20

The adipic acid of Example 16 is replaced with 1 pbw of glutaric acid, citric acid, succinic acid and succinic anhydride in each of Examples 17-20 respectively and similar odor reducing results for these compositions are obtained as compared to the composition of Example 15.

EXAMPLES 21-26

The crystal polystyrene of Examples 1-6 is reduced to 10%, leaving a composition comprised of a polyphenylene ether resin in an amount of 90 pbw and a crystal polystyrene resin in an amount of 10 pbw. The odor reducing stabilizers of Examples 2-6 in the same amounts are added to the compositions of Examples 22-26 and Example 21 is an untreated control. Similar odor reducing results are obtained for the composition of Examples 22-26 as are seen above for Examples 2-6.

Other modifications and variations of this invention are possible and are contemplated as within the scope of this invention. It should be understood, therefore, that changes may be made in the particular embodiments shown without departing from the principles of the invention or sacrificing its chief benefits.

What is claimed is:

1. A foamed thermoplastic composition comprising:

a) a polyphenylene ether resin in combination with a polystrene resin; and b) at least one dicarboxylic acid having the general formula HOOC—X-13 COOH, wherein X is a sigma bond or is a difunctional radical selected from straight or branched alkyl radicals, straight or branched alkenyl radicals, aryl radicals, or substituted radicals of any of the foregoing; wherein the component (b) is presented in an amount effective to reduce the odor of the component (a).

2. The composition of claim 1, wherein component (b) is selected from the group consisting of oxalic acid; malonic acid; succinic acid; glutaric acid; adipic acid; maleic acid; fumaric acid; phthalic acid; isophthalic acid; terephthalic acid; bromoglutaric acid; dimethylglutaric acid; and mixtures of any of the foregoing.

3. The composition of claim 1, wherein the polystyrene resin is the rubber-modified, high impact type.

4. The composition of claim 1, wherein component (b) is present in an amount of from about 0.1 to about 10 parts by weight, based on 100 parts by weight of component (a).

5. The composition of claim 1, wherein component (a) is selected from the group consisting of poly(2,6-dimethyl-1,4-phenylene ether) and poly (2,6-dimethyl-co-2,3,6-trimethyl-1,4-phenylene ether).

6. The composition of claim 1, wherein component (a) has an intrinsic viscosity of about 0.30 to 0.6 deciliters per gram in chloroform at 25 degrees Centigrade.

7. The composition of claim 1, wherein component (a) is comprised of a polyphenylene ether is an amount of from about 10 to 90 parts by weight and a polystrene resin in an amount of from about 90 to about 10 parts by weight, based on 100 parts by weight of (a).

8. The composition of claim 7, wherein component (a) is comprised of a polyphenylene ether in an amount of about 50 parts by weight and a polystrene resin in an amount of about 50 parts by weight.

* * * * *